March 28, 1961 W. F. OLSON 2,977,165
SLUSH PUMP PISTON SNAP RING INSERTION
Filed Feb. 16, 1959
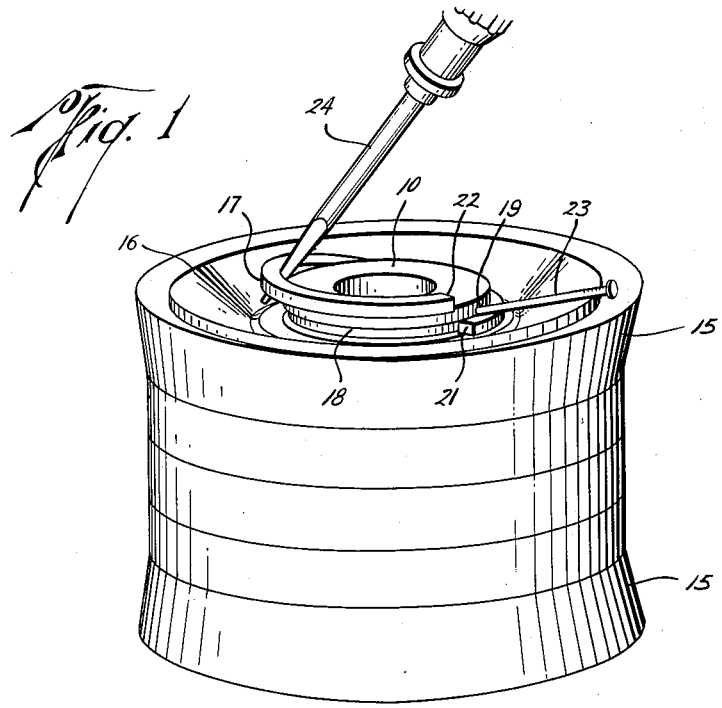
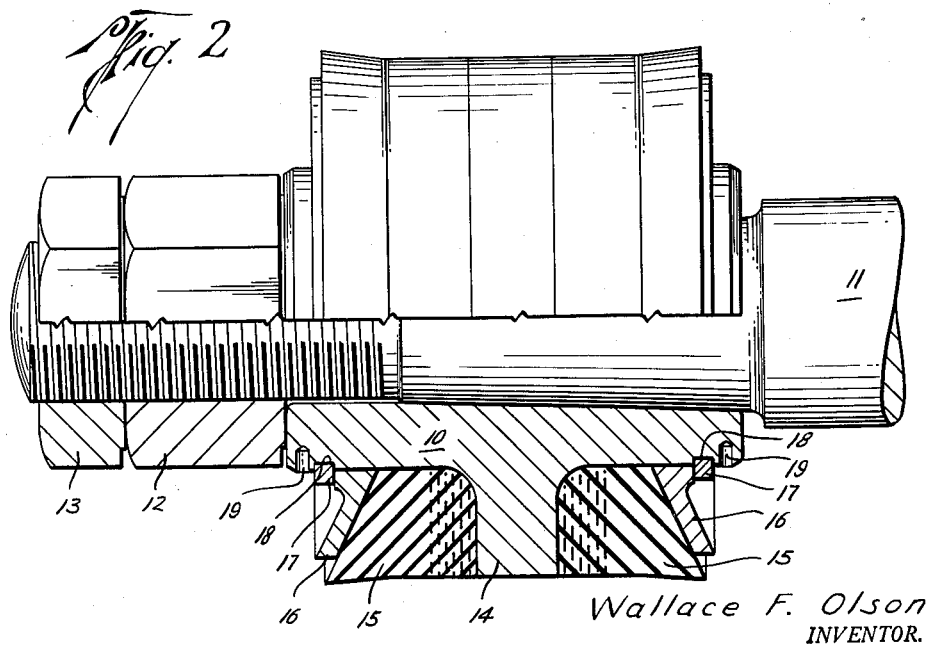
Wallace F. Olson
INVENTOR.
BY Murray Robinson
ATTORNEY of fabric reinforced vulcanized synthetic rubber compound. Adjacent each seal ring is an annular end plate 16 for holding the seal ring 15 on the piston body 10. Each end plate is retained in position by a split steel snap ring 17 received in an annular groove 18 around the end of the tubular body 10. Adjacent each groove 18 is a radial hole 19.

2,977,165

SLUSH PUMP PISTON SNAP RING INSERTION

Wallace F. Olson, Oklahoma City, Okla., assignor to American Iron & Machine Works Company, Inc., Oklahoma City, Okla., a corporation of Delaware Filed Feb. 16, 1959, Ser. No. 793,600

2 Claims. (Cl. 309—4)

This invention pertains to slush pump pistons, and more particularly to the replacement of the seal rings thereof.

Simple easy ways to replace the seal rings of a slush pump piston have been sought for many years. Currently used slush pump pistons usually comprise a tubular body adapted to fit over the end of a piston rod and having a central radially extending flange to back up annular rubber seal rings slipped over the ends of the tubular body. The seal rings are held in place by annular end plates passed over the ends of the body and held in position by split steel rings that are snapped into annular grooves at the ends of the body. Some difficulty is experienced in placing these snap rings in the grooves, but no remedy for this difficulty has been provided despite the fact that this type of piston has been in use for decades. Recognition of the difficulty is evidenced by the many attempts to provide other means of retaining the seal rings than by means of snap rings, but this mode of assembly continues to be most prevalent.

The object of the invention is to provide a slush pump piston of the replaceable seal ring type employing snap ring retention of the end plates in which the insertion of the snap rings will be much easier, and a method of so inserting the snap rings.

According to the invention the piston body is provided at each end with a radial hole closely adjacent the snap ring groove nearest the end of the piston body. The snap ring, whose inner diameter is smaller than the end of the piston body, is laid on the end of the piston body roughly concentric with the tubular piston body and with the split portion of the ring disposed over the end of the body and adjacent the end plate. This will dispose one end of the split ring between the hole and the end plate. A nail or wire or similar body is then inserted in the hole to hold the end of the snap ring against axial displacement. A screw driver or similar bar is then used as a prise by insertion between the end of the piston body and snap ring at a point opposite the split to expand the ring and force it over the end of the piston body. The ring is then driven down with a hammer and nail set or the like until it snaps into the annular groove in the piston body.

For a more detailed description of a preferred embodiment of the invention reference will now be made to the accompanying drawings wherein:

Figure 1 is a half sectional elevation showing a slush pump piston embodying the invention; and Figure 2 is a perspective of the piston of Figure 1 illustrating the method of the invention.

Referring now to Figure 1 there is shown a piston comprising a tubular body 10 whose interior may be tapered to fit on the end of a piston rod 11 where it is secured by nuts 12, 13. The piston body has a central radially extending flange 14. The ends of the body 10 are generally cylindrical on their outer surfaces forming hubs. Over the hubs or ends of the piston body and adjacent flange 14 are disposed seal rings 15, which may be made As shown in Figure 2, after the snap ring has been placed on the end of the piston body with the ends 21, 22 near the hole 19 and with the ends adjacent the annular end plate 16, a nail 23 is inserted in hole 19. Then a screw driver 24 is used as a lever or prise to expand the snap ring and force it over the end of the piston body, following which the snap ring is driven axially along the piston body until it snaps into groove 18.

The hole 19 may be directed other than radially and additional holes may be provided if desired. However, one hole at each end is sufficient, and a radial hole receiving a straight nail or other pin will provide a radial surface to better engage the flat side of the snap ring.

While a preferred embodiment of the invention has been shown and described, many modifications thereof can be made by one skilled in the art without departing from the spirit of the invention and it is desired to protect by Letters Patent all forms of the invention falling within the scope of the following claims.

I claim:

1. Method of installing a snap ring in annular groove in a hub having a hole in the hub adjacent the groove between the end of the hub and the groove comprising placing the snap ring at the end of the hub with the split portion of the snap ring over the hub and beyond the hole, inserting a pin in the hole to hold one end of the snap ring, prising the ring over the end of the hub, and driving the ring axially along the hub into said groove.

2. In a slush pump piston body, said body having a generally cylindrical hub adapted to receive both a seal ring and an annular end plate, said body having an annular flange therearound adjacent the hub adapted to back up said seal ring when placed on the hub, said hub having an annular groove therearound spaced axially from the flange a distance equal to the axial extent along the hub peripheral surface of said seal ring and end plate, said groove being adapted to receive a snap ring to hold said end plate on said hub with said seal ring held in position between said flange and said end plate; the improvement according to which said hub has a transverse hole therein disposed adjacent said groove and located on the opposite side of said groove from said flange and adapted to receive a pin to hold one end of said snap ring in place in said groove while the remainder of said ring is prised over the end of said hub and driven into the groove.

References Cited in the file of this patent

UNITED STATES PATENTS

| 2,306,838 | Volpin | Dec. 29, 1942 |
| 2,317,122 | Volpin | Apr. 20, 1943 |
| 2,449,942 | Johnson | Sept. 21, 1948 |
| 2,586,087 | Reynolds et al. | Feb. 19, 1952 |